Nov. 8, 1927. 1,648,554
T. B. LUNDIN ET AL
MEASURING AND DISPENSING MACHINE
Filed March 19, 1926 5 Sheets-Sheet 2
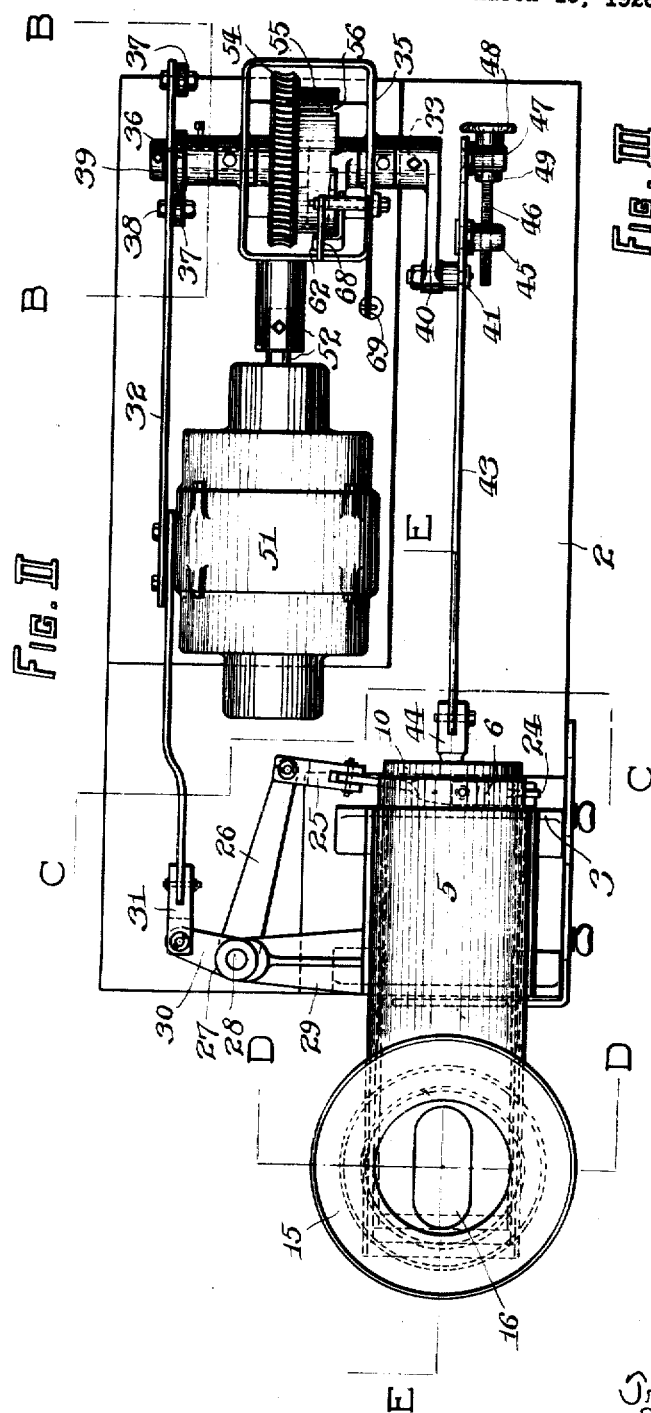
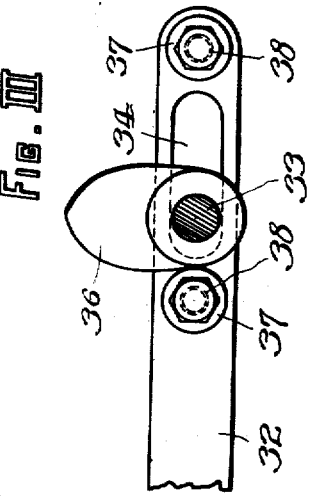
INVENTORS:
Trued B. Lundin
and James F. McGhee
BY
T. V. Trout
ATTORNEY Nov. 8, 1927.  1,648,554
T. B. LUNDIN ET AL
MEASURING AND DISPENSING MACHINE
Filed March 19, 1926  5 Sheets-Sheet 3
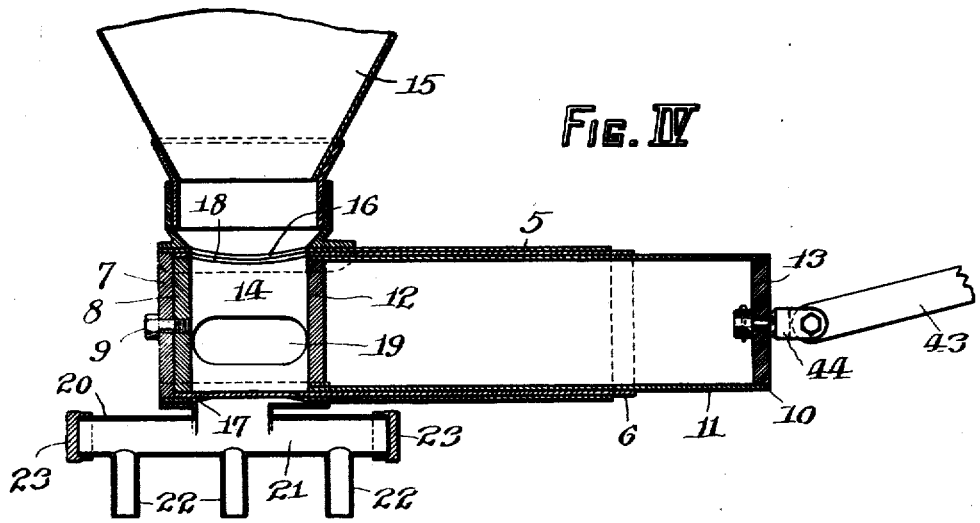
Fig. IV
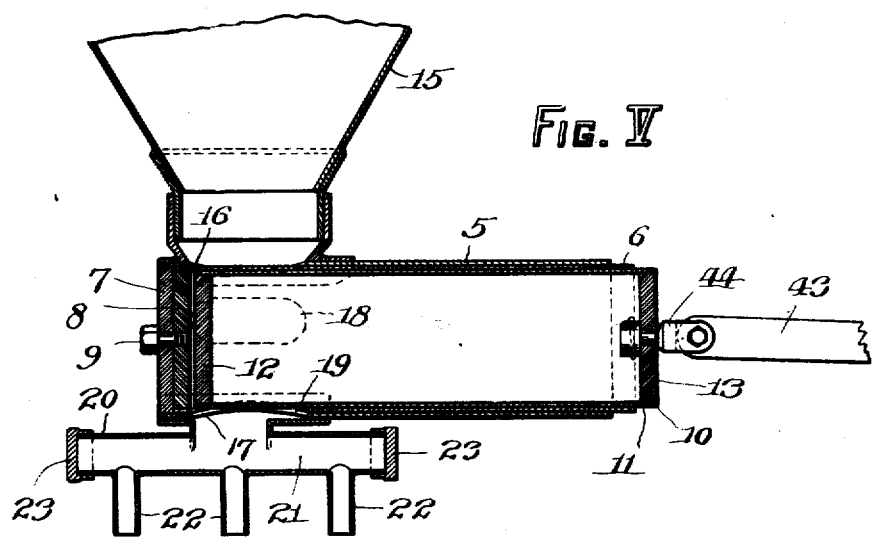
Fig. V
INVENTORS:
Trued B. Lundin
and James F. McGhee
BY
ATTORNEY

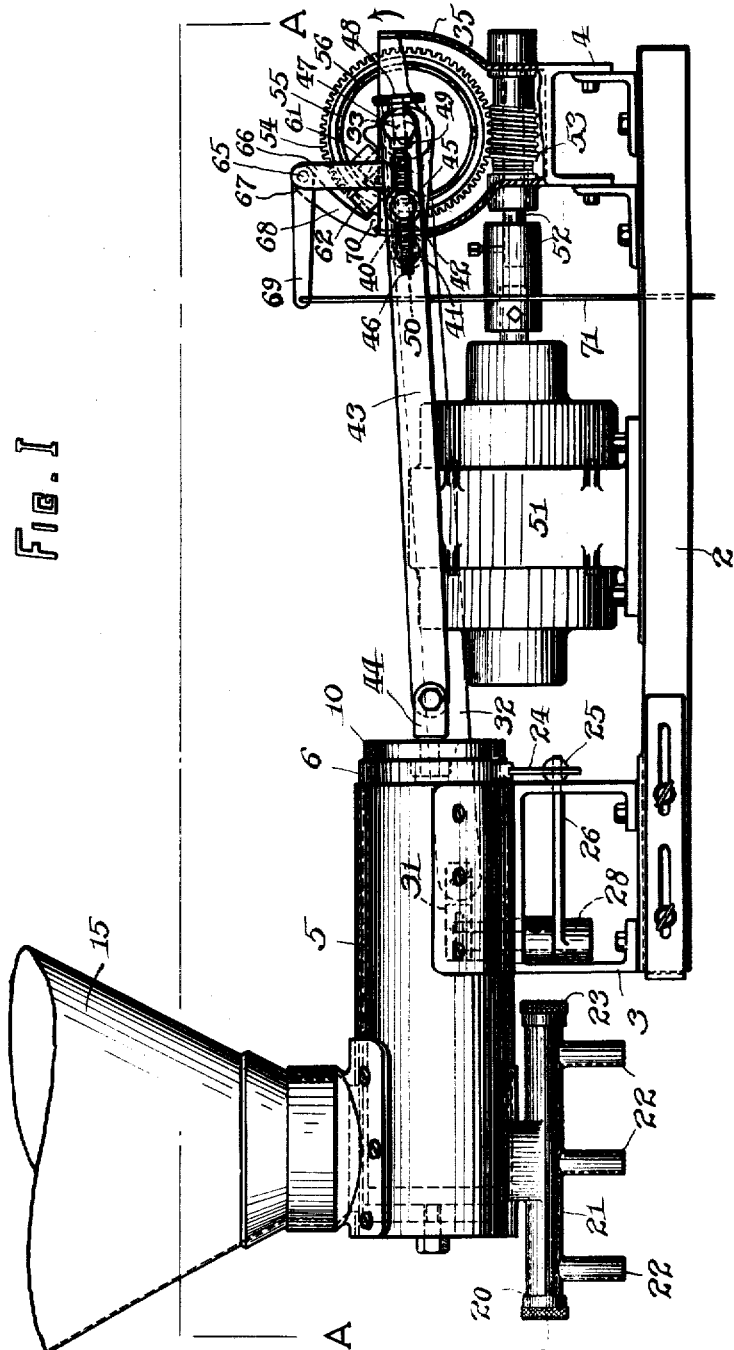

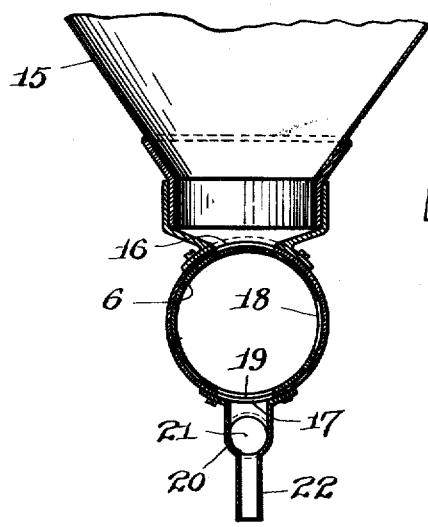
Fig. VI
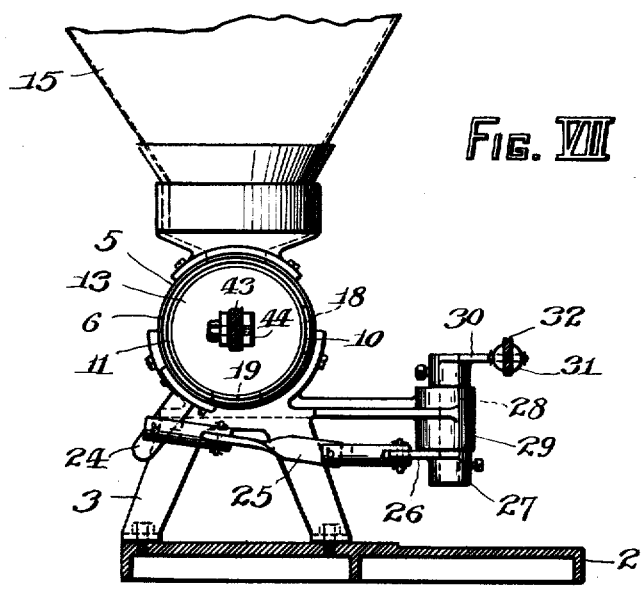
Fig. VII

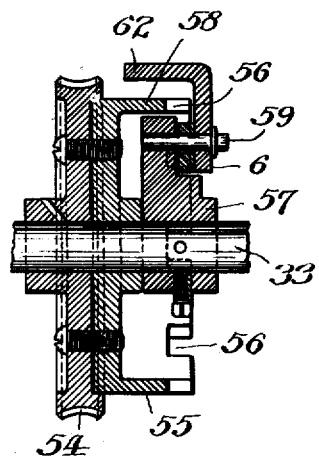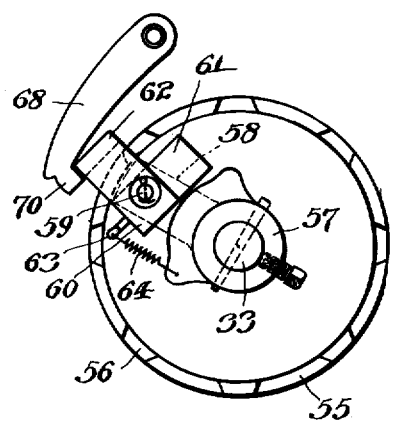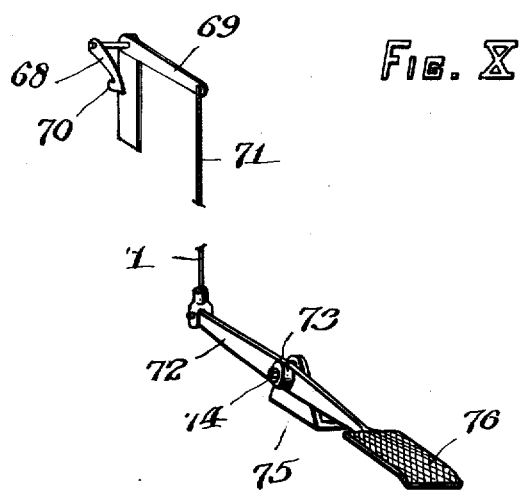

Patented Nov. 8, 1927.

1,648,554

UNITED STATES PATENT OFFICE.

TRUED B. LUNDIN, OF PHILADELPHIA, PENNSYLVANIA, AND JAMES F. McGHEE, OF MOORESTOWN, NEW JERSEY, ASSIGNORS TO AMERICAN MACHINERY CO., INC., OF PHILADELPHIA, PENNSYLVANIA, A CORPORATION OF DELAWARE.

MEASURING AND DISPENSING MACHINE.

Application filed March 19, 1926. Serial No. 95,883.

This invention relates to improvements in machines for measuring and dispensing plastic or semi-liquid material in uniform quantities for any desired purpose.

The object of the invention is to provide a novel, simple and efficient construction and organization of mechanism having provision; first, whereby uniform quantities of the material acted upon may be successively drawn from a supply hopper and discharged from the machine; second, whereby such successive operations may be effected by instrumentality of a rotatable shaft which is turned one complete revolution for each successive operation; third, whereby the machine will automatically stop the said shaft after it has been set in motion and turned one complete revolution; forth, whereby the said measured quantities of material may be discharged from the machine in a plurality of streams in equal proportions; and, fifth, whereby various novel and advantageous operations may be effected.

With the foregoing and related objects in view, the invention consists of the elements and the combinations of them hereinafter described and claimed.

In the accompanying drawings, illustrating the invention,

Figure I is a side view of a measuring and dispensing machine embodying our invention.

Figure II is a plan thereof as seen from the line A—A of Fig. I.

Figure III is a sectional detail showing one of the cams and adjuncts, on line B—B of Fig. II.

Figures IV and V are vertical sections through the measuring and dispensing parts, on line E—E of Fig. II, showing the parts in different positions.

Figure VI is a transverse section through parts shown in Fig. 4, on line D—D of Fig. II.

Figure VII is a transverse section through the machine, on line C—C of Fig. II.

Figure VIII is a side view of the automatic stopping device.

Figure IX is a section through the automatic stopping device.

Figure X is a perspective view of a pedal device for controlling the machine.

Referring to the drawings, the frame of the machine includes a bed plate 2 and brackets 3 and 4 rising from the end portions thereof.

The bracket 3 supports a horizontally arranged cylindrical part 5 having a valve cylinder 6 fitted to the interior thereof to be oscillated on its axis therein. The outer end of the cylindrical part 5 is closed by a disc or head 7 which is secured therein, and the outer end of the valve cylinder 6 is closed by a head or disc 8 which is secured thereto and held in place adjacent to the head 7 by a screw 9 which extends axially through the head 7 and is screwed into the head 8 in a manner to turn within the head 7 and permit the cylinder 6 to be oscillated.

Slidably fitted within the valve cylinder 6 is a piston 10 comprising a cylindrical body 11 having end heads or discs 12 and 13 secured therein. The parts enclose a cylindrical measuring chamber 14 formed within the cylindrical parts 5 and 6 and between the valve head 8 and the piston head 12 when the latter is retracted to the position shown in Fig. IV.

Mounted on the outer end portion of the cylindrical part 5 is a supply hopper 15 adapted to contain the material to be measured and dispensed by the machine. The bottom of the hopper 15 is in communication with the measuring chamber 14 through an inlet port 16 in the top of the part 5; and the bottom of the part 5 is provided with an outlet port 17 through which the material may be discharged from the chamber 14.

The valve cylinder 6 is provided with inlet and outlet openings 18 and 19, respectively, which are positioned with relation to the ports 16 and 17 so that when the valve cylinder is turned to the position shown in Fig. IV the opening 18 will be in registry with the inlet port 16 to open communication between the hopper 15 and measuring chamber 14, and the body of the valve cylinder 6 will close the discharge port 17; and so that, when the cylinder 6 is turned to the position shown in Figs. V and VI, the opening 19 will be in registry with the outlet port 17 to permit the discharge of the material from the chamber 14, and the body of the valve cylinder 6 will close the inlet port 16. It will thus be seen that when the valve cylinder 6 is successively oscillated from the position shown in Fig. IV to the position shown in Fig. V and back again, the cylinder 6 will close the inlet and outlet ports 16 and 17 in alternate succession.

The piston 10 is, by mechanism hereinafter described, reciprocated to move it from the position shown in Fig. V to the position shown in Fig. IV, when the outlet port 17 is closed, to draw the material from the hopper 15 into the chamber 14, and to move it from the position shown in Fig. IV to the position shown in Fig. V, when the inlet port 16 is closed, to discharge the material from the chamber 14 through the outlet port 17.

Secured to the bottom of the cylinder part 6 is a distributing member 20 having an elongated, horizontally-disposed chamber 21. The outlet port 17 of the measuring chamber 14 discharges into the chamber 21, and the member 20 is provided with a plurality of downwardly directed spouts 22 providing passages for discharging material from the distributing chamber 21. The distributing chamber 21 is formed by the straight tubular body of the member 20 which is provided with removable end heads 23 to afford access to the chamber 21 for cleaning and other purposes. The spouts 22 are arranged in suitable spaced relation, and the outer spouts are spaced from the ends of the chamber 21, for purposes hereinafter explained.

The valve cylinder 6 is provided with a downwardly projecting arm 24 which is connected by a jointed link 25 to one arm 26 of a bell-crank lever 27 which is fulcrumed, at 28, on a projecting arm 29 of the frame bracket 3. The other arm 30 of the lever 27 is connected to a block 31 which is pivoted to one end of a bar 32. The other end of the bar 32 is supported by a horizontal shaft 33 which extends transversely through a longitudinal slot 34 (Fig. III) in the bar 32. The shaft 33 is journaled in bearings on the side walls of a box or housing 35 which forms a part of the frame bracket 4, and through which the shaft 33 extends. The shaft 33 carries a cam 36 which is located adjacent to the bar 32 and between two spaced rollers 37 carried by stud shafts or bolts 38 which project fixedly from the bar 32 beyond the respective ends of the slot 34 therein, whereby, when the shaft 33 is rotated, the cam 36 will act upon the rollers 37 in alternate succession and reciprocate the bar 32. When the bar 32 is thus reciprocated, it slides freely over the shaft 33 between the cam 36 and a collar 39 secured to the shaft and it oscillates the bell-crank lever 27 in a manner to cause it, through the jointed link 25, to oscillate the valve cylinder 6. The relation of the cam 36 to the valve cylinder 6, and the connections between them is such that, at the limit of the movement of the cylinder 6 in one direction, the cylinder opening 18 will be in registry with the inlet port 16 for the measuring chamber 14, and that, at the limit of the movement of the cylinder 6 in the reverse direction, the cylinder opening 19 will be in registry with the outlet port 17 for the chamber 14. Also the contour of the cam 36 is such that it permits the valve cylinder 6 to remain at rest for a short period of time at the end of its movement in each direction while the shaft 33 continues to turn, for a purpose hereinafter explained.

The shaft 33 carries a crank arm 40 provided with an outwardly projecting pin 41 having a reduced portion which extends through a longitudinal slot 42 in one end portion of a bar 43 which is supported by the pin 41. The other end portion of the bar 43 is pivotally connected to a block 44 which is secured to and projects outwardly from the central portion of the head or disc 13 forming the outer end of the piston 10. Extending through the slot 42 in the bar 43 and slidably fitted to the bar is an adjustable block 45. This block 45 extends outwardly from the bar 43 and is provided with a threaded hole therein for the reception of a threaded rod 46 which is fitted to be turned in a bearing 47 projecting fixedly from the bar 43. The rod 46 is provided with a suitable head 48 by means of which it may be turned by hand. Longitudinal displacement of the rod 46 is prevented by the head 48 engaging one side of the bearing 47 and a collar 49 on the rod 46 engaging the other side of the bearing 47. It will now be understood that by turning the head 48 and therewith the rod 46 the block 45 may thereby be adjusted toward or from the end 50 of the slot 42 to vary the space between the block 47 and the slot end 50. The crank pin 41 is located in that part of the slot 42 which is between its end 50 and the block 45, and, during the rotation of the shaft 33, the crank pin 41 will work within the slot 42 and engage its end 50 and the block 45 in alternate succession and thereby cause the bar 43 to reciprocate the piston 10, lost motion of the piston occurring as the crank pin 41 moves from one to the other of the block 45 and slot end 50, for a purpose presently appearing. The extent of movement of the piston 10 at each reciprocation thereof may be varied by turning the head 48 and thereby adjusting the block 45 either toward or from the slot end 50.

Normally, or when the machine is at rest, the parts thereof occupy the positions shown in all figures of the drawings excepting Figs. IV and VI the piston 10 is resting at the limit of its inward movement and the valve cylinder 6 is resting in a position in which it closes the inlet port 16 for the measuring chamber 14 and in which its opening 19 is in registry with the outlet port 17 for the chamber 14.

Now, the connections between the shaft 33 and the piston 10 and valve cylinder 6 are so timed and related to each other that, each time the shaft 33 is turned a complete revolution, in the direction of the arrow in Fig. I, the following measuring and filling operation takes place:

While the crank pin 41 moves idly through the slot 42 from its end 50 to the block 45, the piston 10 remains at the limit of its inward movement and the cam 36 engages a roller 37 and turns the valve cylinder 6 from the position shown in Fig. V to the position shown in Fig. IV, thereby closing the outlet port 17 for the measuring chamber 14 and opening the inlet port 16 thereof. This done, the crank pin 41 engages the block 45 and retracts the piston 10 from the position shown in Fig. V to the position shown in Fig. IV, while the cam 36 moves idly between the rollers 37, and the valve cylinder 6 remains at rest in the position shown in Fig. IV. As the piston 10 is thus retracted it draws material from the hopper 15 through the port 16 and opening 18 into the measuring chamber 14 and fills the same. The cam 36 now engages a roller 37 and turns the valve cylinder 6 from the position shown in Fig. IV to the position shown in Fig. V, thereby closing the inlet port 16 and opening the outlet port 17, while the crank pin 41 moves idly through the slot 42 from the block 45 to the slot end 50. Following this operation, the crank pin 41 engages the slot end 50 and moves the piston 10 inwardly from the position shown in Fig. IV to the position shown in Fig. V, as the shaft 33 completes the turning of a revolution and returns the parts to the normal or rest position. As the piston 10 is thus moved to the position shown in Fig. V, it forces the material within the measuring chamber 14 out through the opening 19 and through the outlet port 17 into the receiving and distributing member 20.

The capacity of the distributing member 20 including its spouts 22 is equal to or in excess of the capacity of the measuring chamber 14; and, during the successive operations of the machine, the member 20 remains charged with the material being measured and dispensed; and, at each revolution of the shaft 33, a measured quantity of material, equal to the capacity of the chamber 14, is drawn from the hopper 15, and the same quantity of the material is discharged from the three spouts 22 of the member 20 in equal proportions. As the central spout 22 is located directly opposite to the outlet port 17 of the measuring chamber 14, the cross sectional area of the passage in the central spout 22 is made somewhat less than the area of each outer spout 22, so that the flow of material from the three spouts will be approximately equal. The extension of the ends of the chamber 21, beyond the outer spout 22 also serves to ensure the proper or uniform flow of the material through the outer spouts 22. The material may be discharged from the three spouts 22 into or onto any suitable device or devices for any desired purpose. By adjusting the head 48, the block 45 may be set to vary the stroke of the piston 10, as previously explained, and thereby vary the quantity of material discharged from the spouts 22 at each operation.

We shall now describe the mechanism for operating the shaft 33.

Secured upon the bed plate 2 is a motor 51, preferably electric, which may be of any approved type. The power shaft 52 of the motor 51 extends into the box 35 and it is provided with a worm 53 operatively engaged with a worm wheel 54 which is fitted to turn loosely on the shaft 33, whereby, when the motor 51 is in operation, the worm wheel 54 is continuously rotated on the shaft 33.

The worm wheel 54 is provided with an annular flange 55 which extends laterally therefrom and which is provided with a circular series of spaced notches 56. Secured to the shaft 33 adjacent to the worm wheel 54 is a collar 57 provided with a projecting arm 58. Fulcrumed, at 59, on the arm 58 is a clutch lever 60 having one arm 61 located within the worm wheel flange 55 and having another arm 62 which extends outwardly beyond the periphery of the flange 55 and then parallel with the axis of the shaft 33 and across the outer surface of the flange 55. The lever 60 is provided with a projecting pin 63 which is connected by a spring 64 to the collar 57. The spring 64 acts upon the lever 60 to press its arm 61 against the inner surface of the flange 55, so that, when the lever 60 is free to act in that manner, the arm 61 will enter one of the notches 56 of the flange 55 and cause the collar 57 and shaft 33 to be rotated by and with the worm wheel 54 until the lever 60 is moved against the action of the spring 64, as hereinafter explained, to disengage the arm 61 from the notch 56 in the flange 55, whereupon the shaft 33 will cease to rotate and the worm wheel 54 will turn idly thereon.

Fulcrumed, at 65, on an arm 66 which projects upwardly from one side of the box 35 is a lever 67 comprising two arms 68 and 69. The free end portion of the lever arm 68 is provided with a projection 70 which is adapted to be engaged by the clutch lever arm 62 and to rest against the flange 55 when not engaged by the arm 68. The free end portion of the lever arm 69 is connected by a rod 71 to one arm 72 of a foot lever 73 which is fulcrumed, at 74, on a bracket 75 which is suitably supported below the bed plate 2. The forwardly projecting arm 76 of the lever 73 is adapted to be engaged by the foot of the person operating the machine to depress the arm 76 and thereby raise the arm 72 and lever arms 68 and 69 to disengage the projection 70 from the clutch lever arm 62. When the foot lever arm 76 is released, the weight of the rod 71 and its lever arms 68, 69 and 72 tends to move the lever arm 68 toward the flange 55.

In the normal position of the machine the lever arm 68 rests in the position shown in Fig. VIII in which the projection 70 holds the clutch lever arm 61 inwardly away from the inner surface of the flange 55, permitting the motor 51 to rotate the worm wheel 54 idly on the shaft 33.

When the foot lever arm 76 is depressed, the lever arms 68 and 69 are thereby raised, freeing the clutch lever arm 62 from engagement with the lever projection 70 and permitting the spring 64 to move the clutch lever arm 61 into engagement with the inner surface of the rotating flange 55 and into one of the notches 56 thereof and cause the clutch lever 60, collar 57 and shaft 33 to be rotated with the worm wheel 54. After the shaft 33 starts to rotate and the clutch lever arm 62 passes the projection 70, the foot lever arm 76 is released permitting the lever arm 68 to move down and engage its projection 70 with the flange 55. The lever arm 68 remains in this positon until the shaft 33 is turned a complete revolution by the worm wheel 54, whereupon the clutch lever arm 62 meets and engages the lever projection 70 which thereupon operates the clutch lever 60 to disengage its arm 61 from the flange 55 and to stop the rotation of the shaft 33, leaving the parts in the position shown in Fig. VIII for a succeeding operation.

It will thus be understood that each time the lever arm 68 is raised by the foot lever 73 and released, the normally idle shaft 33 will be turned a complete revolution and automatically stop at the completion thereof, and that each time the shaft 33 is thus turned a revolution, a predetermined quantity of the material being acted upon by the machine will be discharged from the spouts 22, as previously explained.

We claim:—

1. In a measuring and dispensing machine, the combination of a supporting frame, a part fixedly supported by said frame enclosing a measuring chamber having an inlet port and an outlet port, a driving element rotatably supported by said frame, a material supplying holder in communication with the inlet port, means operated by said element to close the outlet port and open the inlet port and to open the outlet port and close the inlet port in alternate succession, and means operated by said element to automatically draw material into said chamber when the inlet port is open and to discharge the material from said chamber when the outlet port is open.

2. In a measuring and dispensing machine, the combination of a supporting frame, a part enclosing a measuring chamber having an inlet port and an outlet port, a material supplying holder in communication with the inlet port, a continuously actuated driving element, a normally idle driving element, means operable to operatively connect said elements and thereby cause the actuation of the second named element by the first named element, means to automatically disconnect said elements following a predetermined operation of the normally idle element, means operated by the normally idle element each time it is actuated to close the outlet port and open the inlet port and thereafter to open the outlet port and close the inlet port, and means operated by the normally idle element each time it is actuated to draw material into said chamber when the inlet port is open and to discharge the material from said chamber when the outlet port is open.

3. In a measuring and dispensing machine, the combination of a supporting frame, a part enclosing a measuring chamber having an inlet port and an outlet port, a material supplying holder in communication with the inlet port, a continuously rotating driving element, a normally idle rotatable driving element, means operable to operatively connect said elements and thereby cause the rotation of the second named element by the first named element, means to automatically disconnect said elements upon the completion of one revolution of the normally idle element, means operated by the normally idle element each time it is turned one revolution to close the outlet port and open the inlet port and thereafter to open the outlet port and close the inlet port, and means operated by the normally idle element each time it is turned one revolution to draw material into said chamber when the inlet port is open and to discharge the material from said chamber when the outlet port is open.

4. In a measuring and dispensing machine, the combination of a supportng frame, a part enclosing a cylindrical measuring chamber having an inlet port and an outlet port, a material supplying holder in communication with the inlet port, a valve cylinder adapted to be oscillated within said part and provided with means to close the outlet port and open the inlet port when oscillated to one position and to open the outlet port and close the inlet port when oscillated to another position, a driving element, a lever operated by said element and operatively connected to said cylinder and a piston within said cylinder and said chamber and operable to draw material into said chamber from said holder and to discharge the material from the chamber.

5. In a measuring and dispensing machine, the combination of a supporting frame, a part enclosing a cylindrical measuring chamber having an inlet port and an outlet port, a material supplying holder in communication with the inlet port, a valve cylinder adapted to be oscillated within said part and provided with means to close the outlet port and open the inlet port when oscillated to one position and to open the outlet port and close the inlet port when oscillated to another position, a piston within said cylinder and said chamber and adapted to be reciprocated to draw material into said chamber from said holder when moved in one direction and to discharge the material from the chamber when moved in the reverse direction, a driving element, means operated by said element to oscillate said cylinder to its said two positions in alternate succession, and reciprocating means for said piston operated by said element and timed to move the piston in one direction while the cylinder is in one of said positions and to move the piston in the reverse direction when the cylinder is in the other of said positions.

6. In a measuring and dispensing machine, the combination of a supporting frame, a part enclosing a cylindrical measuring chamber having an inlet port and an outlet port, a material supplying holder in communication with the inlet port, a valve cylinder adapted to be oscillated within said part and provided with means to close the outlet port and open the inlet port when oscillated to one position and to open the outlet port and close the inlet port when oscillated to another position, a piston within said cylinder and said chamber and adapted to be reciprocated to draw material into said chamber from said holder when moved in one direction and to discharge the material from the chamber when moved in the reverse direction, a rotatable driving shaft, a cam on said shaft, means operated by said cam to oscillate said cylinder to its said two positions in alternate succession, and means operated by said shaft to reciprocate said piston and timed to move the piston in one direction while the cylinder is in one of said positions and to move the piston in the reverse direction when the cylinder is in the other of said positions.

7. In a measuring and dispensing machine, the combination of a supporting frame, a part enclosing a cylindrical measuring chamber having an inlet port and an outlet port, a material supplying holder in communication with the inlet port, a valve cylinder adapted to be oscillated within said part and provided with means to close the outlet port and open the inlet port when oscillated to one position and to open the outlet port and close the inlet port when oscillated to another position, a piston within said cylinder and said chamber and adapted to be reciprocated to draw material into said chamber from said holder when moved in one direction and to discharge the material from the chamber when moved in the reverse direction, a rotatable driving shaft, means operated by said shaft to oscillate said cylinder to its said two positions in alternate succession, a link connected to said piston and having a slot therein, and a crank on said shaft having a pin extending into said slot and related thereto to reciprocate the piston during the rotation of the shaft and permit the piston to rest at the end of each stroke, the parts being so timed that the cylinder is moved when the piston is at rest and that the piston is moved in one direction while the cylinder is in one of its said positions and that the piston is moved in the reverse direction when the cylinder is in the other of its said positions.

8. In a measuring and dispensing machine, the combination of a supporting frame, a part enclosing a cylindrical measuring chamber having an inlet port and an outlet port, a material supplying holder in communication with the inlet port, a valve cylinder adapted to be oscillated within said part and provided with means to close the outlet port and open the inlet port when oscillated to one position and to open the outlet port and close the inlet port when oscillated to another position, a piston within said cylinder and said chamber and adapted to be reciprocated to draw material into said chamber from said holder when moved in one direction and to discharge the material from the chamber when moved in the reverse direction, a rotatable driving shaft, a cam on said shaft, means operated by said cam to oscillate said cylinder to its said two positions in alternate succession, a link connected to said piston and having a slot therein, and a crank on said shaft having a pin extending into said slot and related thereto to reciprocate the piston during the rotation of the shaft and permit the piston to rest at the end of each stroke, the parts being so timed that the cylinder is moved when the piston is at rest and that the piston is moved in one direction while the cylinder is in one of its said positions and that the piston is moved in the reverse direction when the cylinder is in the other of its said positions.

9. In a measuring and dispensing machine, the combination of a supporting frame, a part enclosing a cylindrical measuring chamber having an inlet port and an outlet port, a material supplying holder in communication with the inlet port, a valve cylinder adapted to be oscillated within said part and provided with means to close the outlet port and open the inlet port when oscillated to one position and to open the outlet port and close the inlet port when oscillated to another position, a piston within said cylinder and said chamber and adapted to be reciprocated to draw material into said chamber from said holder when moved in one direction and to discharge the material from the chamber when moved in the reverse direction, a continuously actuated driving element, a normally idle driving element, means operable to operatively connect said elements and thereby cause the actuation of the second named element by the first named element, means to automatically disconnect said elements following a predetermined operation of the normally idle element, means operated by the normally idle element each time it is actuated to oscillate said cylinder to its said two positions in alternate succession, and reciprocating means for said piston operated by the normally idle element each time it is actuated and timed to move the piston in one direction while the cylinder is in one of its said positions and to move the piston in the reverse direction when the cylinder is in the other of said positions.

In testimony whereof we affix our signatures.

TRUED B. LUNDIN.
JAMES F. McGHEE.

draw material into said chamber from said holder when moved in one direction and to discharge the material from the chamber when moved in the reverse direction, a continuously actuated driving element, a normally idle driving element, means operable to operatively connect said elements and thereby cause the actuation of the second named element by the first named element, means to automatically disconnect said elements following a predetermined operation of the normally idle element, means operated by the normally idle element each time it is actuated to oscillate said cylinder to its said two positions in alternate succession, and reciprocating means for said piston operated by the normally idle element each time it is actuated and timed to move the piston in one direction while the cylinder is in one of its said positions and to move the piston in the reverse direction when the cylinder is in the other of said positions.

In testimony whereof we affix our signatures.

TRUED B. LUNDIN.
JAMES F. McGHEE.

DISCLAIMER.

1,648,554.—*Trued B. Lundin*, Philadelphia, Pa., and *James F. McGhee*, Moorestown, N. J. MEASURING AND DISPENSING MACHINE. Patent dated November 8, 1927. Disclaimer filed April 30, 1929, by the assignee, *American Machinery Co., Inc.*, and the exclusive licensee *American Machine & Foundry Co.* (not of record).

Hereby enter the following disclaimer:

Petitioners disclaim from the scope of claim 1 all measuring and dispensing machines except those in which the means for drawing material into and discharging it from the chamber include a piston working in said chamber; and in which the means for opening and closing the ports are valves; and in which the driving element includes a shaft which imparts motion to slotted links for operating respectively the piston and the valves, said shaft having a crank with a pin which extends into the slot of a piston-operating link, and said shaft extending through the slot of a valve-operating link, and said shaft carrying a cam adapted to co-operate with rollers adjacent the ends of the slot in said valve-operating link, whereby the desired timed relation between the movement of the piston and valves may be effected.

[*Official Gazette May 21, 1929.*]

DISCLAIMER.

1,648,554.—*Trued B. Lundin*, Philadelphia, Pa., and *James F. McGhee*, Moorestown, N. J. MEASURING AND DISPENSING MACHINE. Patent dated November 8, 1927. Disclaimer filed April 30, 1929, by the assignee, *American Machinery Co., Inc.*, and the exclusive licensee *American Machine & Foundry Co.* (not of record).

Hereby enter the following disclaimer:

Petitioners disclaim from the scope of claim 1 all measuring and dispensing machines except those in which the means for drawing material into and discharging it from the chamber include a piston working in said chamber; and in which the means for opening and closing the ports are valves; and in which the driving element includes a shaft which imparts motion to slotted links for operating respectively the piston and the valves, said shaft having a crank with a pin which extends into the slot of a piston-operating link, and said shaft extending through the slot of a valve-operating link, and said shaft carrying a cam adapted to co-operate with rollers adjacent the ends of the slot in said valve-operating link, whereby the desired timed relation between the movement of the piston and valves may be effected.

[*Official Gazette May 21, 1929.*]